United States Patent
Colglazier et al.

(10) Patent No.: US 8,838,909 B2
(45) Date of Patent: *Sep. 16, 2014

(54) DYNAMIC INITIAL CACHE LINE COHERENCY STATE ASSIGNMENT IN MULTI-PROCESSOR SYSTEMS

(75) Inventors: Daniel J. Colglazier, Cary, NC (US); Marcus L. Kornegay, Durham, NC (US); Ngan N. Pham, Raliegh, NC (US); Cristian G. Rojas, Raliegh, NC (US)

(73) Assignee: International Business Machines Corporation, Armonk, NY (US)

( * ) Notice: Subject to any disclaimer, the term of this patent is extended or adjusted under 35 U.S.C. 154(b) by 2079 days.

This patent is subject to a terminal disclaimer.

(21) Appl. No.: 11/775,085

(22) Filed: Jul. 9, 2007

(65) Prior Publication Data

US 2009/0019230 A1    Jan. 15, 2009

(51) Int. Cl.
G06F 12/00 (2006.01)
G06F 13/00 (2006.01)
G06F 13/28 (2006.01)
G06F 12/08 (2006.01)

(52) U.S. Cl.
CPC ................. *G06F 12/0815* (2013.01)
USPC .......................... 711/147; 711/141

(58) Field of Classification Search
None
See application file for complete search history.

(56) References Cited

U.S. PATENT DOCUMENTS

| | | | |
|---|---|---|---|
| 6,148,416 A | 11/2000 | Masubuchi | |
| 6,338,124 B1 | 1/2002 | Arimilli et al. | |
| 6,345,341 B1 | 2/2002 | Arimilli et al. | |
| 6,353,875 B1 | 3/2002 | Arimilli et al. | |
| 6,356,982 B1 | 3/2002 | Arimilli et al. | |
| 2009/0019233 A1 | 1/2009 | Colglazier et al. | |

OTHER PUBLICATIONS

The Cache Memory Book, second edition, Academic Press, 1998, by Jim Handy, pp. 137-158.*
The Cache Memory Book, 2nd edition, 1998 Academic Press, by Jim Handy, pp. 152-155 and 216-217.*
Abella, et al.; "IATAC: A Smart Predictor to Turn-Off L2 Cache Lines", ACM Transactions on Architucture and Code Optimization, vol. 2, No. 1, Mar. 2005, pp. 55-57.
Evan Speight, et al., "Adaptive Mechanisms and Policies for Managing Cache Heirarches in Chip Multiprocessors", Proceedings of the 32nd International Symmposium on Computer Architechture, 2005, 11 Pages.
Jaume Abella, et al., "IATAC: A Smart Predictor to Turn-off L2 Cache Lines", ACM Transactions on Architecture and Code Optimization, vol. 2, No. 1, Mar. 2005, pp. 55-77.
Chi-Hung Chi, et al., "Unified Management of Registers and Cache Using Liveness and Cache Bypass", Association for Computing Machinery, ACM 0-89791-306-X/89/0006/0344, 1989, pp. 344-355.

* cited by examiner

*Primary Examiner* — Michael Alsip
(74) *Attorney, Agent, or Firm* — Edward J. Lenart; Katherine S. Brown; Biggers Kennedy Lenart Spraggins LLP (57) ABSTRACT

A method, system, and computer program product for providing lines of data from shared resources to caching agents are provided. The method, system, and computer program product provide for receiving a request from a caching agent for a line of data stored in a shared resource, assigning one of a plurality of coherency states as an initial coherency state for the line of data, each of the plurality of coherency states being assignable as the initial coherency state for the line of data, and providing the line of data to the caching agent in the initial coherency state assigned to the line of data.

18 Claims, 5 Drawing Sheets

DYNAMIC INITIAL CACHE LINE COHERENCY STATE ASSIGNMENT IN MULTI-PROCESSOR SYSTEMS

FIELD OF THE INVENTION

The present invention relates generally to providing lines of data from shared resources to caching agents.

BACKGROUND OF THE INVENTION

Presently, when lines of data are provided from a shared resource (e.g., memory) to caching agents (e.g., microprocessors) in response to a read access request, the initial coherency state (e.g., shared state, exclusive state, etc.) assigned to each line of data provided is always the same. For instance, some systems always provided a line in a shared state, while other systems always provided a line in an exclusive state. The initial coherency state to be assigned each line of data is typically integrated into the system design (e.g., hard-coded into memory controller logic). This is problematic because the same initial coherency state may not be suitable for every situation (e.g., every type of application, every line of data, and the like). As a result, system performance may be negatively affected.

SUMMARY OF THE INVENTION

A method, system, and computer program product for providing lines of data from shared resources to caching agents are provided. The method, system, and computer program product provide for receiving a request from a caching agent for a line of data stored in a shared resource, the shared resource being shared between the caching agent and at least one other caching agent, assigning one of a plurality of coherency states as an initial coherency state for the line of data requested by the caching agent, each of the plurality of coherency states being assignable as the initial coherency state for the line of data, and providing the line of data stored in the shared resource to the caching agent in the initial coherency state assigned to the line of data.

DETAILED DESCRIPTION

The present invention generally relates to providing lines of data from shared resources to caching agents. The following description is presented to enable one of ordinary skill in the art to make and use the invention and is provided in the context of a patent application and its requirements. The present invention is not intended to be limited to the implementations shown, but is to be accorded the widest scope consistent with the principles and features described herein.

Increasingly, systems have resources (e.g., memory, different levels of caches, and the like) that are shared among multiple caching agents (e.g., microprocessors). A multiprocessor system (e.g., a system with two or more microprocessors) is an example of such a system. In a multiprocessor system, each microprocessor has one or more dedicated caches to temporarily store frequently used data (e.g., instructions) for quicker access. The frequently used data stored in these caches are copies of data stored in other resources (e.g., memory or higher level caches) that take longer to access.

When data from a single resource is shared by multiple caching agents, coherency (e.g., data integrity) becomes an issue. For instance, if one caching agent modifies a copy of a piece of data from the single resource that is stored in its cache, then another caching agent cannot be allowed to store another copy of the piece of data from the single resource in its cache because the piece of data in the single resource has not been updated since the modification. Coherency ensures that each caching agent operates on the most current copy of data that is available.

Many types of coherency protocols are available, such as, MSI, MESI, MOSI, and so forth. Each letter in a coherency protocol represents a coherency state that may be assigned to a line of data (e.g., a piece of data or a unit of data). Lines of data are stored in entries of caches, which are sometimes referred to as cache lines. Each cache entry has a bitfield that can be set to indicate a coherency state of the line of data stored therein. At any point in time, only one coherency state can be set for each cache line.

The letter "M" represents a "Modified" state, which means a copy of a line of data stored in a cache has been modified and, as a result, the modified copy will need to be written back to a resource from which the line of data was copied. In other words, the original line of data stored in the resource will need to be updated.

The letter "S" represents a "Shared" state, which means a copy of a line of data stored in a cache may also be stored in another cache. In other words, multiple caches may simultaneously have copies of the same line of data from a resource.

The letter "I" represent an "Invalid" state, which means a copy of a line of data stored in a cache is not available. The line of data may be invalidated in response to, for instance, another copy of the line of data having been modified in another cache.

The letter "E" represents an "Exclusive" state, which means a copy of a line of data stored in a cache is up-to-date and no other caches have a valid copy of the line of data. In other words, the line of data has not been modified since the copy of the line of data was cached and any other copy of the line of data that may be stored in other caches has been invalidated.

The letter "O" represents an "Owned" state, which typically means a copy of a line of data stored in a cache is not stored in any other caches and a caching agent associated with the cache will service access requests for the line of data from other caching agents. However, depending on implementation, another caching agent could potentially have another copy of the same line of data in a shared state.

Currently, systems with resources shared by multiple caching agents are designed in such a way that every line of data provided from a shared resource to a caching agent is assigned the same initial coherency state for a particular type of request (e.g., read access requests). For instance, a memory controller will be designed such that it always provides a line of data to a caching agent in the same coherency state when a read access request is received. As a result, each line of data loaded into the cache of the caching agent will always be set to the same initial coherency state.

The policy of assigning the same initial coherency state to every line of data provided to a caching agent when a specific type of request is received is typically integrated into the hardware design (e.g., hard-coded into memory controller logic) and cannot be changed. Assigning the same initial coherency state to every line of data for a particular type of request can negatively affect system performance because the same initial coherency state may not be suitable for all situations.

For instance, suppose a system is designed such that a "Shared" state is assigned as the initial coherency state for every line of data provided to a caching agent in response to a read access request. In other words, every new line of data loaded into a cache is set to a "Shared" state for read access requests. This type of policy works well if lines of data loaded into a cache are not likely to be modified because read access requests for the lines of data in the cache will not require changing the coherency state of those lines in the cache.

However, if lines of data loaded into a cache are likely to be modified, then the policy may not work so well because write access requests (e.g., modifications) will require changing the coherency state of those lines in the cache. Changing the coherency state of a line of data in a cache involves issuing requests, which adds to overhead, increases latency, and impacts overall system performance.

On the other hand, suppose a system is designed such that an "Exclusive" state is assigned as the initial coherency state for every line of data provided to a caching agent in response to a read access request. In other words, every new line of data loaded into a cache is set to an "Exclusive" state for read access requests. This type of policy works well if lines of data loaded into a cache are likely to be modified because write access requests for the lines of data in the cache will not require changing the coherency state of those lines in the cache.

However, if lines of data loaded into a cache are not likely to be modified, then the policy may not be ideal because before any line of data in the cache can be loaded into another cache, the coherency state for the line of data in the cache may need to be changed. As discussed above, changing the coherency state of a line of data in a cache involves issuing requests, which adds to overhead, increases latency, and impacts overall system performance.

Figure 1:
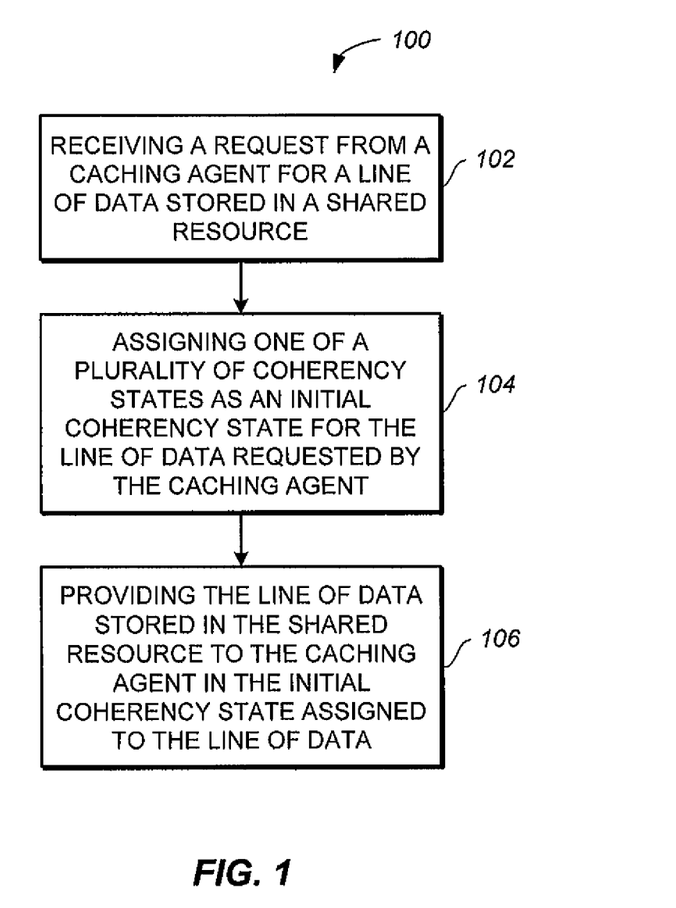
FIG. 1 depicts a process providing lines of data from shared resources to caching agents according to an implementation of the invention.

Depicted in FIG. 1 is a process 100 for providing lines of data from shared resources to caching agents according to an implementation of the invention. At 102, a request from a caching agent for a line of data stored in a shared resource is received. The request is a specific type of request. In one implementation, the request is a read access request.

The shared resource is shared between the caching agent and at least one other caching agent. In one implementation, the shared resource is a memory. In another implementation, the shared resource is a higher level cache. The caching agent may be a microprocessor with one or more processing cores.

At 104, one of a plurality of coherency states is assigned as an initial coherency state for the line of data requested by the caching agent. Each of the plurality of coherency states is assignable as the initial coherency state for the line of data. Hence, the initial coherency state assigned to the line of data requested by the caching agent is not always the same for the specific type of request.

For instance, the initial coherency state assigned to the line of data may change depending on the caching agent requesting the line of data. In addition, each line of data requested by the caching agent is not necessarily assigned the same initial coherency state given the same type of request.

At 106, the line of data stored in the shared resource is provided to the caching agent in the initial coherency state assigned to the line of data. In one implementation, the line of data stored in the shared resource is provided to the caching agent by providing a copy of the line of data stored in the shared resource to the caching agent.

The caching agent may be associated with one or more caches. In one implementation, the line of data provided to the caching agent is loaded into an entry of a cache associated with the caching agent and a coherency state for the entry of the cache is set to the initial coherency state assigned to the line of data loaded into the entry.

Figure 2:
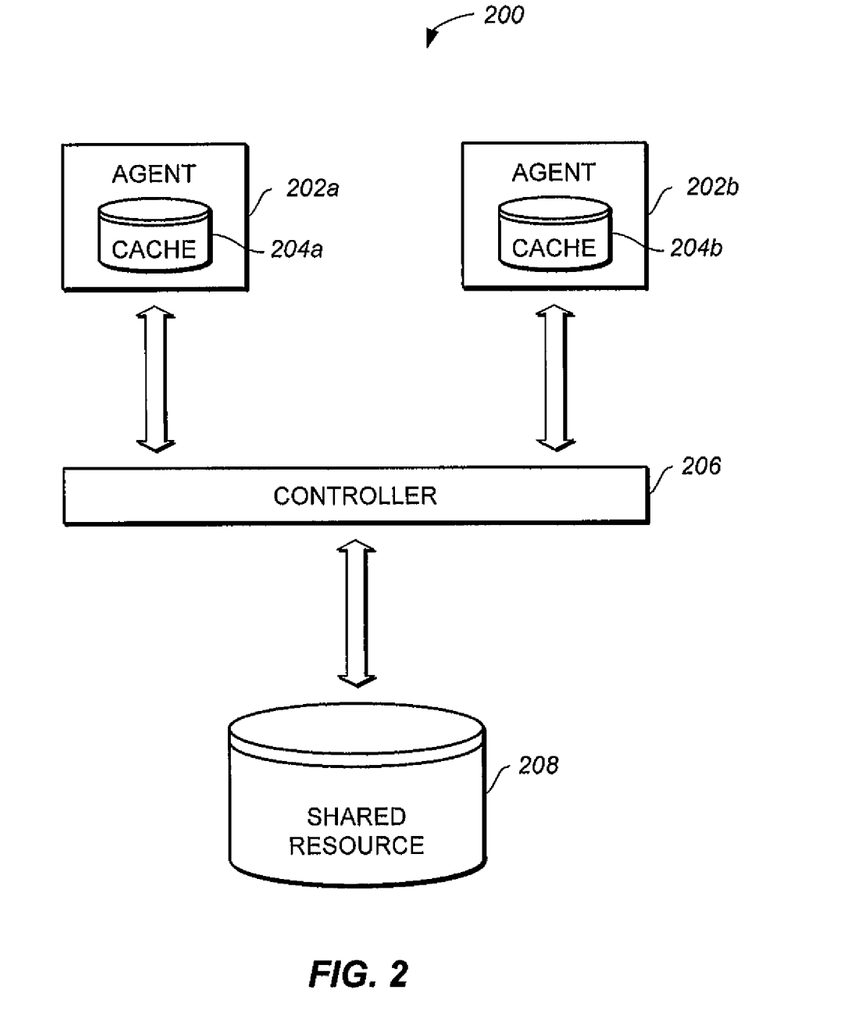
FIG. 2 illustrates a system according to an implementation of the invention.

FIG. 2 illustrates a system 200 according to an implementation of the invention. System 200 includes caching agents 202. Each of the caching agents 202 is associated with a cache 204. In other implementations, one or both of the caching agents 202 may be associated with additional caches (not shown), which may be at different levels. Although not shown, each of the caching agents 202 may also be associated with one or more processing cores.

System 200 also includes a controller 206 in communication with caching agents 202*a* and 202*b*. Controller 206 is in communication with and controls access to a shared resource 208. Shared resource 208 stores a plurality of lines of data and is shared by caching agents 202*a* and 202*b*. In one implementation, shared resource 208 is a memory of system 200. In another implementation, shared resource 208 is a higher level cache of system 200. Hence, lines of data stored in shared resource 208 may themselves be copies of data stored elsewhere. Each line of data stored in shared resource 208 may be an instruction, a part of an instruction, or other data. One or more other shared resources (not shown) and corresponding controller(s) may be situated in between caching agents 202 and controller 206 in system 200.

In the implementation, controller 206 receives a request from one of the caching agents 202 for a line of data stored in shared resource 208. The request is a specific type of request (e.g., a read access request, a write access request, and the like). Controller 206 then assigns one of a plurality of coherency states as an initial coherency state for the line of data requested by the one caching agent 202 and provides the line of data stored in shared resource 208 to the one caching agent 202 in the initial coherency state assigned to the line of data.

Each of the plurality of coherency states is assignable as the initial coherency state for the line of data given the specific type of request received. The initial coherency state assigned to the line of data requested may be, for instance, a shared state or an exclusive state. In one implementation, the one caching agent 202 loads the line of data provided by the controller 206 into an entry of the cache 204 associated with the one caching agent 202 and sets a coherency state for the entry of cache 204 associated with the one caching agent 202 to the initial coherency state assigned by the controller 206.

Figure 3:
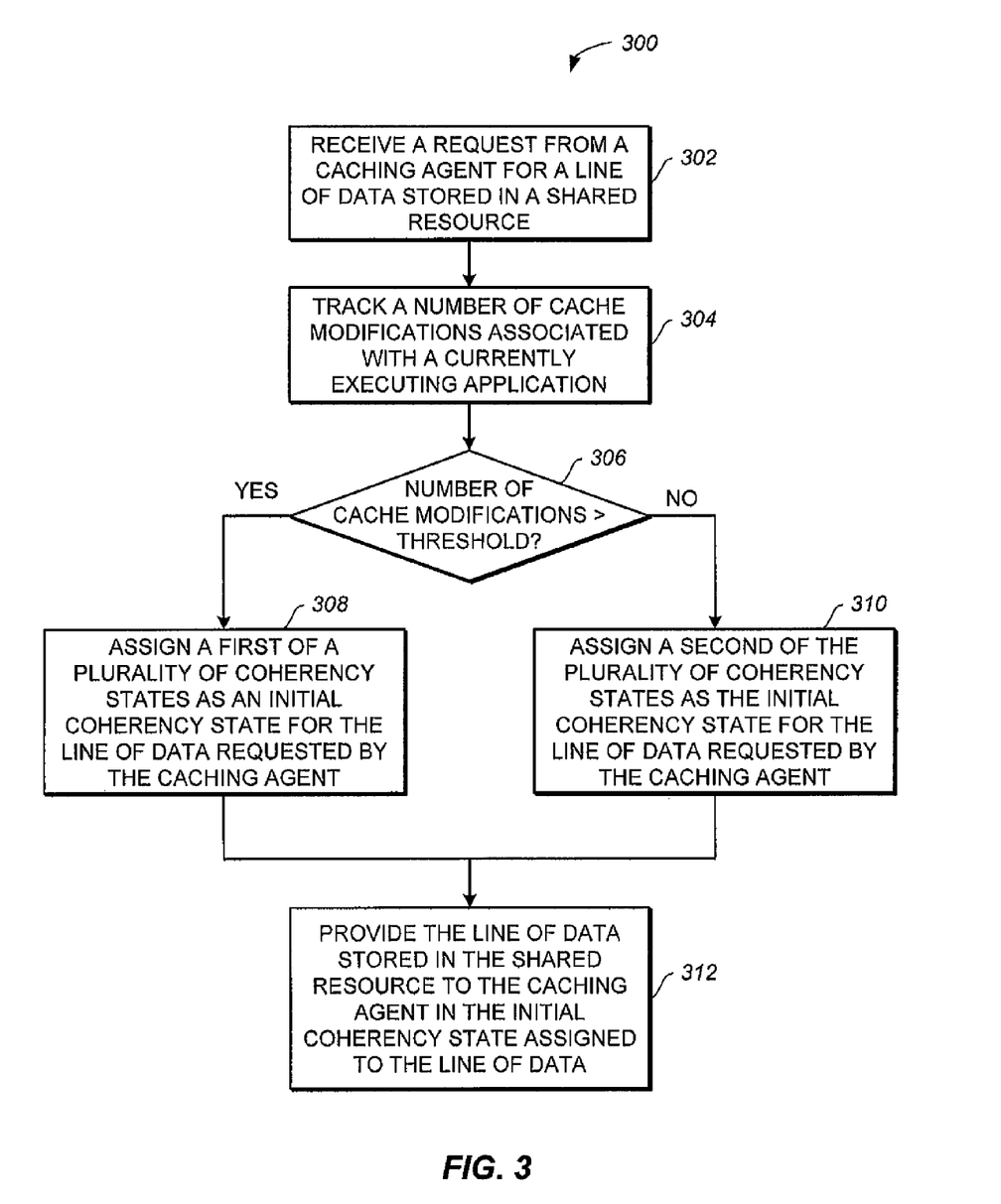
FIG. 3 shows a process providing lines of data from shared resources to caching agents according to an implementation of the invention.

Shown in FIG. 3 is a process 300 for providing lines of data from shared resources to caching agents according to an implementation of the invention. At 302, a request is received from a caching agent for a line of data stored in a shared resource. The request is a specific type of request. A number of cache modifications associated with a currently executing application is tracked at 304.

In one implementation, the number of cache modifications is tracked by maintaining a counter and incrementing the counter each time any line of data stored in the shared resource is updated as a result of a modification made by the caching agent or another caching agent sharing the shared resource. The counter may be maintained at, for instance, the shared resource and incremented by, for instance, a controller that controls access to the shared resource.

When a counter is used to track cache modifications, the counter can be reset if a new application starts executing. In addition, the counter may be decremented when a line of data is removed from a cache. Further, rather than incrementing the counter each time any line of data stored in the shared resource is updated, the counter can be incremented each time any line of data in a cache is modified. Moreover, the number of cache modifications may be calculated by dividing the counter value by a total number of bus reads rather than being strictly equal to the counter value.

At 306, a determination is made as to whether the number of cache modifications associated with the currently executing application exceeds a threshold (e.g., a predetermined number of modifications). If the threshold is exceeded, a first of a plurality of coherency states is assigned as an initial coherency state for the line of data requested by the caching agent at 308 given the specific type of request received. If the threshold is not exceeded, a second of the plurality of coherency states is assigned as the initial coherency state for the line of data requested by the caching agent at 310 given the specific type of request received. The line of data stored in the shared resource is then provided to the caching agent in the initial coherency state assigned to the line of data at 312.

By dynamically and intelligently assigning initial coherency states based on characteristics of a currently executing application for a given type of request received, better system performance can be achieved because the initial coherency state best suited for each application for the given type of request will be used to optimize system performance. For instance, if an application is likely to modify lines of data, then it is advantageous to assign an exclusive state to lines of data provided to a caching agent in response to read access requests because when a line of data is modified, there will be no need to change the coherency state of that line of data before the modification can occur.

In addition, if an application is likely to modify lines of data, then it is disadvantageous to assign a shared state to lines of data provided to a caching agent in response to read access requests because before a line of data can be modified, an invalidate request must be sent to all other caching agents to invalidate (e.g., remove) any other copies of the line of data so that it can be placed in an exclusive state. The invalidate request cannot be carried out if another copy of the line of data is already in an exclusive or a modified state. Further, the invalidate request adds to system traffic, which impacts system performance.

On the other hand, if an application is unlikely to modify lines of data, then it is advantageous to assign a shared state to lines of data provided to a caching agent in response to read access requests because a read access request for a line of data does not require checking a lower level cache to see if another copy of the line of data in the lower level cache is in another coherency state as the other copy of the line of data can only be in the shared state.

Whereas, if an application is unlikely to modify lines of data, then it is disadvantageous to assign an exclusive state to lines of data provided to a caching agent in response to read access requests because a read access request for a line of data requires checking a lower level cache to see if another copy of the line of data in the lower level cache is in another coherency state as the other copy of the line of data can be in a shared state, an exclusive state, or a modified state.

Figure 4:
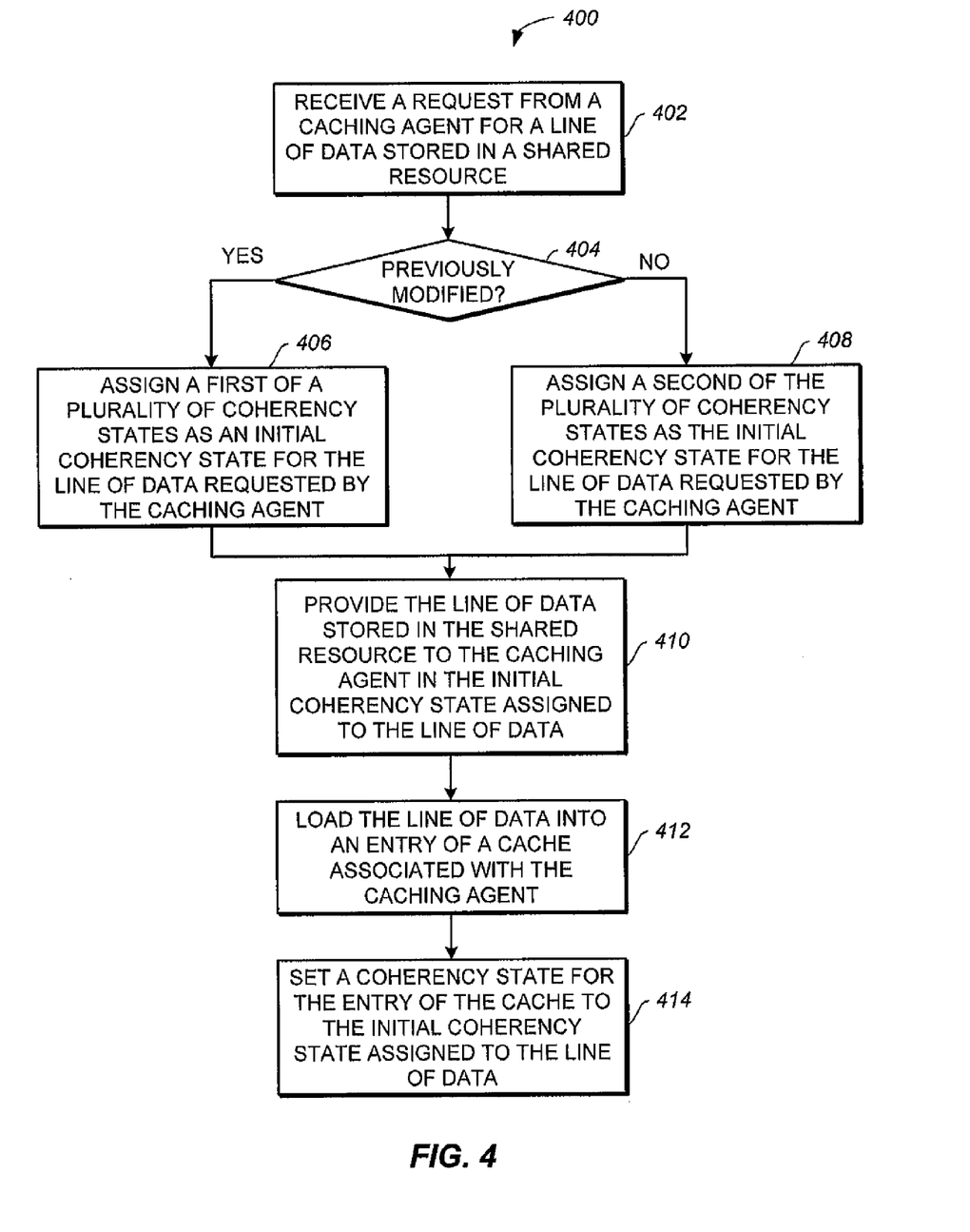
FIG. 4 depicts a process providing lines of data from shared resources to caching agents according to an implementation of the invention.

FIG. 4 depicts a process 400 for providing lines of data from shared resources to caching agents according to an implementation of the invention. At 402, a request for a line of data stored in a shared resource is received from a caching agent. The request is a specific type of request. The shared resource is shared between the caching agent and at least one other caching agent. At 404 a determination is made as to whether the line of data has been previously modified by the at least one other caching agent.

In one implementation, a bit is maintained for the line of data. The bit maintained for the line of data is then set in response to the line of data stored in the shared resource being updated as a result of a modification made by the at least one other caching agent. Hence, determination of whether the line of data has been previously modified can be done by determining whether the bit maintained for the line of data has been set.

The bit may be maintained in the shared resource or in another location, and may be set by a controller controlling access to the shared resource or the other location. In one implementation, the bit is reset if the line of data is removed from a cache associated with a caching agent. In another implementation, the bit is reset if the line of data is removed from the shared resource. A counter can be maintained to track the number of times a line of data has been modified. The counter can be an alternative to maintaining a bit or the counter can be used to determine when to set the bit (e.g., the bit will be set only if the counter exceeds a threshold).

If the line of data has been previously modified by the at least one other caching agent, then a first of a plurality of coherency states (e.g., an exclusive state) is assigned as an initial coherency state for the line of data requested by the caching agent at 406 given the specific type of request received. If the line of data has not been previously modified by the at least one other caching agent, then a second of the plurality of coherency states (e.g., a shared state) is assigned as the initial coherency state for the line of data requested by the caching agent at 408 given the specific type of request received.

At 410, the line of data stored in the shared resource is provided to the caching agent in the initial coherency state assigned to the line of data. At 412, the line of data provided to the caching agent is loaded into an entry of a cache associated with the caching agent. At 414, a coherency state for the entry of the cache associated with the caching agent is set to the initial coherency state assigned to the line of data loaded into the entry of the cache.

By dynamically and intelligently assigning initial coherency states based on modification history of each line of data for a particular type of request, improved system performance can be attained because studies have shown that a cached line of data, once modified, is likely to be modified again. Hence, each line of data will be assigned the initial coherency state that is most likely to result in optimal system performance for the particular type of request.

For instance, if a line of data is likely to be modified, then it is advantageous to assign an exclusive state as the initial coherency state for the line of data in response to a read access request because there will be no need to change the coherency state of the line of data before a modification can occur. Whereas, if a shared state was assigned as the initial coherency state for a line of data that is likely to be modified, then before the line of data can be modified, an invalidate request must be sent to all other caching agents to invalidate any other copies of the line of data so that the line of data can be placed in an exclusive state. This takes time to complete and adds traffic to the system, which impacts system performance. In addition, the invalidate request cannot be fulfilled if another copy of the line of data is already in an exclusive or a modified state.

On the other hand, if a line of data is unlikely to be modified, then it is advantageous to assign a shared state as the initial coherency state for the line of data in response to a read access request because a read access request for the line of data will not require checking a lower level cache to see if another copy of the line of data in the lower level cache is in another coherency state as the other copy of the line of data can only be in the shared state.

If a line of data is unlikely to be modified, then it is disadvantageous to assign an exclusive state as the initial coherency state for the line of data in response to a read access request because a read access request for the line of data will require checking a lower level cache to see if another copy of the line of data in the lower level cache is in another coherency state as the other copy of the line of data can be in a shared state, an exclusive state, a modified state, or some other state.

The invention can take the form of an entirely hardware implementation, an entirely software implementation, or an implementation containing both hardware and software elements. In one aspect, the invention is implemented in software, which includes, but is not limited to, application software, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk read—only memory (CD-ROM), and compact disk—read/write (CD-R/W).

Figure 5:
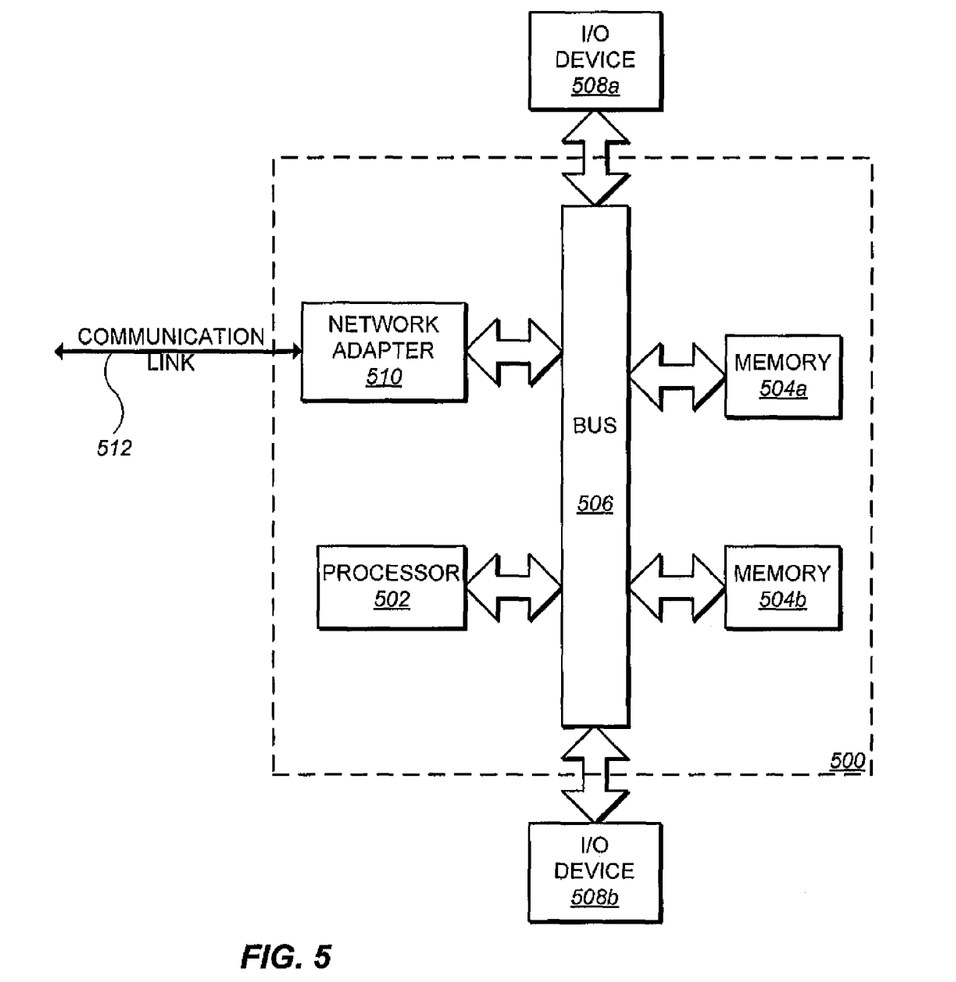
FIG. 5 illustrates a block diagram of a data processing system with which implementations of the invention can be implemented.

FIG. 5 shows a data processing system 500 suitable for storing and/or executing program code. Data processing system 500 includes a processor 502 coupled to memory elements 504a-b through a system bus 506. In other implementations, data processing system 500 may include more than one processor and each processor may be coupled directly or indirectly to one or more memory elements through a system bus.

Memory elements 504a-b can include local memory employed during actual execution of the program code, bulk storage, and cache memories that provide temporary storage of at least some program code in order to reduce the number of times the code must be retrieved from bulk storage during execution. As shown, input/output or I/O devices 508a-b (including, but not limited to, keyboards, displays, pointing devices, etc.) are coupled to data processing system 500. I/O devices 508a-b may be coupled to data processing system 500 directly or indirectly through intervening I/O controllers (not shown).

In the implementation, a network adapter 510 is coupled to data processing system 500 to enable data processing system 500 to become coupled to other data processing systems or remote printers or storage devices through communication link 512. Communication link 512 can be a private or public network. Modems, cable modems, and Ethernet cards are just a few of the currently available types of network adapters.

While various implementations for providing lines of data from shared resources to caching agents have been described, the technical scope of the present invention is not limited thereto. For example, the present invention is described in terms of particular systems having certain components and particular methods having certain steps in a certain order. One of ordinary skill in the art, however, will readily recognize that the methods described herein can, for instance, include additional steps and/or be in a different order, and that the systems described herein can, for instance, include additional or substitute components. Hence, various modifications or improvements can be added to the above implementations and those modifications or improvements fall within the technical scope of the present invention.

What is claimed is:

1. A computer-implemented method for providing lines of data from shared resources to caching agents, the method comprising:
   receiving a request from a caching agent for a line of data stored in a shared resource, the request received being a specific type of request, the shared resource being shared between the caching agent and at least one other caching agent;
   assigning one of a plurality of coherency states as an initial coherency state for the line of data requested by the caching agent, each of the plurality of coherency states being assignable as the initial coherency state for the line of data in response to the specific type of request received; and
   providing the line of data stored in the shared resource to the caching agent in the initial coherency state assigned to the line of data.

2. The method of claim 1, further comprising:
   loading the line of data provided to the caching agent into an entry of a cache associated with the caching agent; and
   setting a coherency state for the entry of the cache associated with the caching agent to the initial coherency state assigned to the line of data loaded into the entry of the cache.

3. The method of claim 1, wherein assigning one of the plurality of coherency states as the initial coherency state for the line of data requested by the caching agent comprises:
   tracking a number of cache modifications associated with a currently executing application;
   assigning a first of the plurality of coherency states as the initial coherency state for the line of data requested by the caching agent responsive to the number of cache modifications associated with the currently executing application exceeding a threshold; and
   assigning a second of the plurality of coherency states as the initial coherency state for the line of data requested by the caching agent responsive to the number of cache modifications associated with the currently executing application not exceeding the threshold.

4. The method of claim 3, wherein tracking the number of cache modifications associated with the currently executing application comprises:
   maintaining a counter; and
   incrementing the counter each time any line of data stored in the shared resource is updated as a result of a modification made by the caching agent or the at least one other caching agent.

5. The method of claim 1, wherein assigning one of the plurality of coherency states as the initial coherency state for the line of data requested by the caching agent comprises:
   determining whether the line of data has been previously modified by the at least one other caching agent;
   assigning a first of the plurality of coherency states as the initial coherency state for the line of data requested by the caching agent responsive to the line of data having been previously modified by the at least one other caching agent; and
   assigning a second of the plurality of coherency states as the initial coherency state for the line of data requested by the caching agent responsive to the line of data not having been previously modified by the at least one other caching agent.

6. The method of claim 5, wherein determining whether the line of data has been previously modified by the at least one other caching agent comprises:
   maintaining a bit for the line of data;
   setting the bit for the line of data responsive to the line of data stored in the shared resource being updated as a result of a modification made by the at least one other caching agent; and
   determining whether the line of data has been previously modified by the at least one other caching agent based on whether the bit maintained for the line of data has been set.

7. A system comprising:
   a plurality of caches;
   a plurality of caching agents, each of the plurality of caching agents being associated with one of the plurality of caches;
   a shared resource storing a plurality of lines of data, the shared resource being shared by the plurality of caching agents; and
   a controller in communication with the shared resource that controls access to the shared resource, the controller
   receiving a request from one of the plurality of caching agents for a line of data stored in the shared resource, the request received being a specific type of request,
   assigning one of a plurality of coherency states as an initial coherency state for the line of data requested by the one caching agent, each of the plurality of coherency states being assignable as the initial coherency state for the line of data in response to the specific type of request received, and
   providing the line of data stored in the shared resource to the one caching agent in the initial coherency state assigned to the line of data.

8. The system of claim 7, wherein the one caching agent loads the line of data provided by the controller into an entry of the cache associated with the one caching agent, and
   sets a coherency state for the entry of the cache associated with the one caching agent to the initial coherency state assigned by the controller to the line of data loaded into the entry of the cache.

9. The system of claim 7, wherein assigning one of the plurality of coherency states as the initial coherency state for the line of data requested by the one caching agent comprises:
   tracking a number of cache modifications associated with a currently executing application;
   assigning a first of the plurality of coherency states as the initial coherency state for the line of data requested by the one caching agent responsive to the number of cache modifications associated with the currently executing application exceeding a threshold; and
   assigning a second of the plurality of coherency states as the initial coherency state for the line of data requested by the one caching agent responsive to the number of cache modifications associated with the currently executing application not exceeding the threshold.

10. The system of claim 9, wherein tracking the number of cache modifications associated with the currently executing application comprises:
    maintaining a counter; and
    incrementing the counter each time any line of data stored in the shared resource is updated as a result of a modification made by the one caching agent or another of the plurality of caching agents.

11. The system of claim 7, wherein assigning one of the plurality of coherency states as the initial coherency state for the line of data requested by the one caching agent comprises:
    determining whether the line of data has been previously modified by another of the plurality of caching agents;
    assigning a first of the plurality of coherency states as the initial coherency state for the line of data requested by the one caching agent responsive to the line of data having been previously modified by another caching agent; and
    assigning a second of the plurality of coherency states as the initial coherency state for the line of data requested by the one caching agent responsive to the line of data not having been previously modified by another caching agent.

12. The system of claim 11, wherein determining whether the line of data has been previously modified by another of the plurality of caching agents comprises:
    maintaining a bit for the line of data;
    setting the bit for the line of data responsive to the line of data stored in the shared resource being updated as a result of a modification made by the at least one other caching agent; and
    determining whether the line of data has been previously modified by the at least one other caching agent based on whether the bit maintained for the line of data has been set.

13. A computer program product comprising a non-transitory computer readable medium, the computer readable medium being encoded with a computer readable program for providing lines of data from shared resources to caching agents, the computer readable program comprising computer executable instructions for:
    receiving a request from a caching agent for a line of data stored in a shared resource, the request received being a specific type of request, the shared resource being shared between the caching agent and at least one other caching agent;
    assigning one of a plurality of coherency states as an initial coherency state for the line of data requested by the caching agent, each of the plurality of coherency states being assignable as the initial coherency state for the line of data in response to the specific type of request received; and
    providing the line of data stored in the shared resource to the caching agent in the initial coherency state assigned to the line of data.

14. The computer program product of claim 13, wherein the computer readable program further comprises computer-executable instructions for:
    loading the line of data provided to the caching agent into an entry of a cache associated with the caching agent; and setting a coherency state for the entry of the cache associated with the caching agent to the initial coherency state assigned to the line of data loaded into the entry of the cache.

15. The computer program product of claim 13, wherein assigning one of the plurality of coherency states as the initial coherency state for the line of data requested by the caching agent comprises:
- tracking a number of cache modifications associated with a currently executing application;
- assigning a first of the plurality of coherency states as the initial coherency state for the line of data requested by the caching agent responsive to the number of cache modifications associated with the currently executing application exceeding a threshold; and
- assigning a second of the plurality of coherency states as the initial coherency state for the line of data requested by the caching agent responsive to the number of cache modifications associated with the currently executing application not exceeding the threshold.

16. The computer program product of claim 15, wherein tracking the number of cache modifications associated with the currently executing application comprises:
- maintaining a counter; and
- incrementing the counter each time any line of data stored in the shared resource is updated as a result of a modification made by the caching agent or the at least one other caching agent.

17. The computer program product of claim 13, wherein assigning one of the plurality of coherency states as the initial coherency state for the line of data requested by the caching agent comprises:
- determining whether the line of data has been previously modified by the at least one other caching agent;
- assigning a first of the plurality of coherency states as the initial coherency state for the line of data requested by the caching agent responsive to the line of data having been previously modified by the at least one other caching agent; and
- assigning a second of the plurality of coherency states as the initial coherency state for the line of data requested by the caching agent responsive to the line of data not having been previously modified by the at least one other caching agent.

18. The computer program product of claim 17, wherein determining whether the line of data has been previously modified by the at least one other caching agent comprises:
- maintaining a bit for the line of data;
- setting the bit for the line of data responsive to the line of data stored in the shared resource being updated as a result of a modification made by the at least one other caching agent; and
- determining whether the line of data has been previously modified by the at least one other caching agent based on whether the bit maintained for the line of data has been set.

\* \* \* \* \*